ly patent [19]

Leini

[11] Patent Number: 4,665,618
[45] Date of Patent: May 19, 1987

[54] DEVICE FOR A MOTORIZED SAW

[75] Inventor: Arvo Leini, Edsbyn, Sweden

[73] Assignee: Santrade Limited, Lucerne, Switzerland

[21] Appl. No.: 826,256

[22] Filed: Feb. 5, 1986

[30] Foreign Application Priority Data

Feb. 13, 1985 [SE] Sweden ............................ 8500656

[51] Int. Cl.⁴ ............................................. B27B 19/02
[52] U.S. Cl. ........................................ 30/392; 83/824
[58] Field of Search ............ 30/392, 393, 394, 166 R, 30/507, 508; 83/824, 825, 746, 783, 821

[56] References Cited

U.S. PATENT DOCUMENTS

| 1,537,980 | 5/1925 | Asselin | 30/392 |
| 1,829,079 | 10/1931 | Young | 30/507 |
| 1,838,125 | 12/1931 | Wirtz | 83/821 X |
| 2,895,514 | 7/1959 | Wright | 30/394 |
| 3,064,698 | 11/1962 | La Force | 83/824 |
| 3,537,490 | 11/1970 | Shaw | 30/166 X |
| 3,748,738 | 7/1973 | Alexander | 30/394 |
| 4,031,622 | 6/1977 | Alexander | 30/392 |

Primary Examiner—Jimmy C. Peters
Attorney, Agent, or Firm—Burns, Doane, Swecker & Mathis

[57] ABSTRACT

A device for a motorized saw wherein the saw guide bar consists of a reciprocating toothed saw blade (13) and a relative to this stationary support plate (12). One circular disc (14) is loosely laid into an elongated recess (15) in the support plate (12) such that it is movable relative to the support plate (12) as well as to the saw blade (13) and therefore the friction against the support plate is diminished.

9 Claims, 6 Drawing Figures

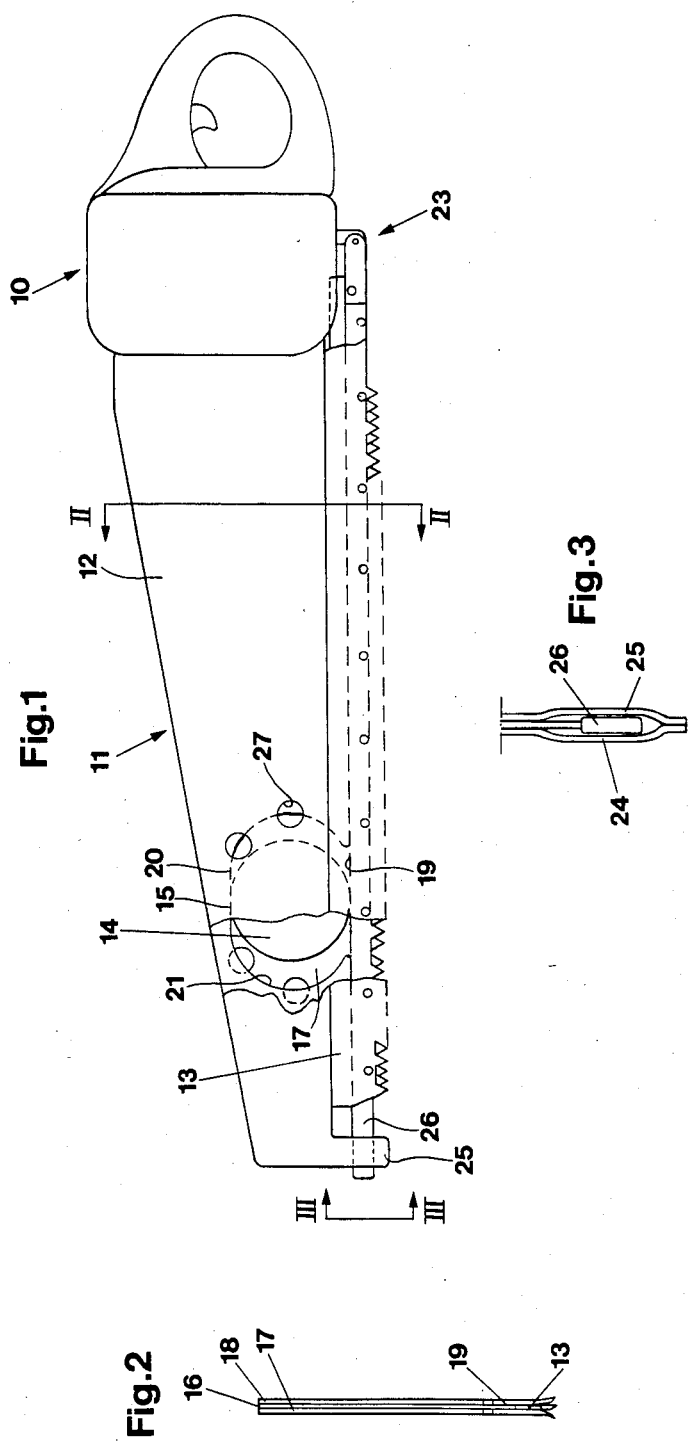

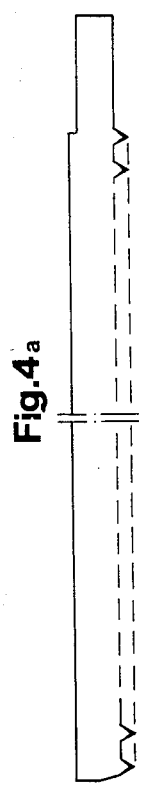

DEVICE FOR A MOTORIZED SAW

BACKGROUND OF THE INVENTION

The present invention relates to a device for a motorized saw of the kind wherein the saw is built up from a reciprocating toothed saw blade and a relative to this stationary support plate.

Electrically driven saws with a reciprocating saw blade motion are long known especially for jig sawing in thin materials such as plywood, fibre board, particle board etc. In these applications narrow saw blades are often used whose width seldom exceed a tenth of the length and therefore sawing of curved contours is facilitated and the friction between the blade and the work piece is diminished. These constructions, however, have the disadvantage of small flexural rigidity and therefore it will be difficult to saw straight in thicker materials and they have been used mainly in materials having a thickness over 3 cm for works with small demands on accuracy, for example demolishing and ingot building.

Furthermore it is known to make motorized saws wherein the saw teeth are arranged on a narrow reciprocating blade, which is movable along the edge of a stationary broad support plate. These are used for example for cutting frozen carcasses, and earlier also for wood felling. In those two applications there has been required motors of considerable power in order to overcome the friction against the support plate as well as the cutting force. There exists a desire to be able to use a corresponding construction for small hand-held saws in order to be able to saw straight cuts in thick wood.

An object of the present invention is to provide a device for such saws arranged such that the friction can be diminished and therefore a power-requiring motor can be used which has a small weight.

BRIEF DESCRIPTION OF THE DRAWINGS

A preferred embodiment of the invention is described in the following with reference to the appended drawings, wherein FIG. 1 is a side view of a motorized saw with the saw guide bar partly in section;

FIG. 2 is a side view of the saw guide bar of the motor saw in a cross section according to line II—II in FIG. 1;

FIG. 3 is a side view of an enlarged partial front view according to the line III—III in FIG. 1 of the saw guide bar; and FIGS. 4A, B and C are views of parts of the saw blade.

DETAILED DESCRIPTION OF A PREFERRED EMBODIMENT

In FIGS. 1–3 is shown a saw guide bar 11 attached to a motor casing 10. The casing encloses a combustion or electrical motor. The saw guide bar consists of a support plate 12 and a reciprocating toothed saw blade 13 slidably arranged thereto. The saw blade 13 consists of three toothed portions secured to each other. The saw blade 13 is arranged so that the direct contact between the support plate 12 and the saw blade 13 only serves to stop the sideways bending of the saw blade 13 while the feed force is carried by one or more circular discs 14, each of which is loosely laid into an elongated recess 15 in the support plate 12. The diameter of each disc 14 is about 100 times the width thereof. The saw blade 13 is connected to the motor by means of levers 23. The levers 23 and co-operating portions in the front end of the saw keep the blade from falling off the saw guide bar 11.

The support plate 12 is built up from three layers, the mid layer 16 of which is equal in thickness as, or somewhat broader than, the side layers 17 and 18 situated on each side thereof. The mid layer has a portion projecting from the support plate which is received in a groove 19 in the saw blade 13. The co-operating portions consist of projections 24, 25 extending mainly perpendicularly to the longitudinal direction of the blade 13 and an extended portion 26 of the saw blade 13. These projections form units with respective associated side layers 17, 18. The projections 24, 25 enclose a spacing which slidably receives the portion 26 without causing any additional frictional force during cutting. Each circular disc 14 is thinner than the mid layer 16 and is loosely laid into the recess 15 which is bordered by a straight contour part 20, parallel with the saw blade 13, and circular end portions 21 and 22 such that the circular disc or circular discs 14 may roll forwards and backwards therein. The saw blade 13 and the support plate 12 have mainly equal thickness.

The diameter of the circular blank 14 is so much larger than the length of the straight part 20 that the circular blank does not fall out from the recess 15 when the saw blade 13 is removed for replacement or sharpening of the teeth. Each circular disc is made with a diameter which exceeds half of the length of the stroke. The circular disc 14 can, with a light bending, because it is made thin and flexible, be brought obliquely into the recess 15 at its broader part. The depth of the recess 15 should be slightly less than the diameter of the circular disc 14.

The recess 15 is opened towards the outside by means of a number of holes 27 in the side layers 17, 18. The holes 27 allow for cut material that has entered the recess 15 to be removed therefrom.

FIGS. 4A–4C show the three parts of the saw blade.

Thus, the present invention relates to a device for a motorized saw which may be driven by a motor having small power and weight and constructed such that the saw blade is mounted to the support plate in a most economic manner in terms of friction. This is achieved by having the center of the disc movable relative to the saw blade as well as to the support plate.

I claim:

1. A device for a motorized saw, comprising:
    a toothed, longitudinally reciprocating saw blade;
    a stationary support plate;
    circular means provided on said stationary support plate for supporting the saw blade;
    said circular means comprises a circular disc, the center of said circular disc being movable longitudinally relative to the toothed reciprocating saw blade and the stationary support plate.

2. The device according to claim 1, wherein said circular disc is received by an elongated recess in the support plate such that the periphery of the disc partly abuts a groove in the saw blade and partly abuts a straight contour part of said elongated recess.

3. The device according to claim 2, wherein the diameter of the circular disc exceeds half of the length of the stroke of the saw blade.

4. The device according to claim 3, wherein the support plate comprises two side layers and a mid layer, the mid layer partly projects from the rest of the support plate and is received in the groove in the saw blade.

5. The device according to claim 4, wherein the thickness of the circular disc is less than the thickness of the mid layer.

6. The device according to claim 4, wherein one end of the saw blade is supported by a front end of the support plate and the other end is supported by a lever mechanism.

7. The device according to claim 6, wherein the saw blade comprises three toothed portions which are secured to each other.

8. The device according to claim 7, wherein the mid portion of the saw blade has an extension in the longitudinal direction of the saw blade which is supported by projections arranged on two side layers of the support plate.

9. The device according to claim 4, wherein a number of holes traverses the side layers such that they at least partly open the recess outwardly.

* * * * *